May 21, 1968     H. C. MILLER     3,383,807
PERIPHERAL DIAMOND GRINDING WHEEL
Filed Nov. 19, 1964     2 Sheets-Sheet 1
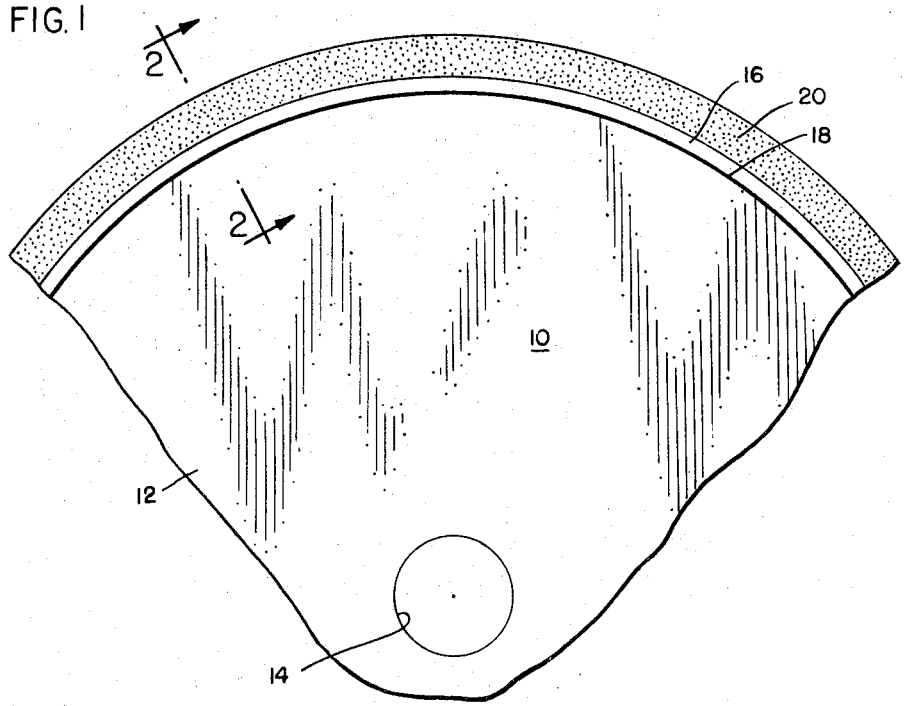
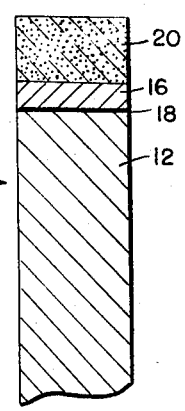
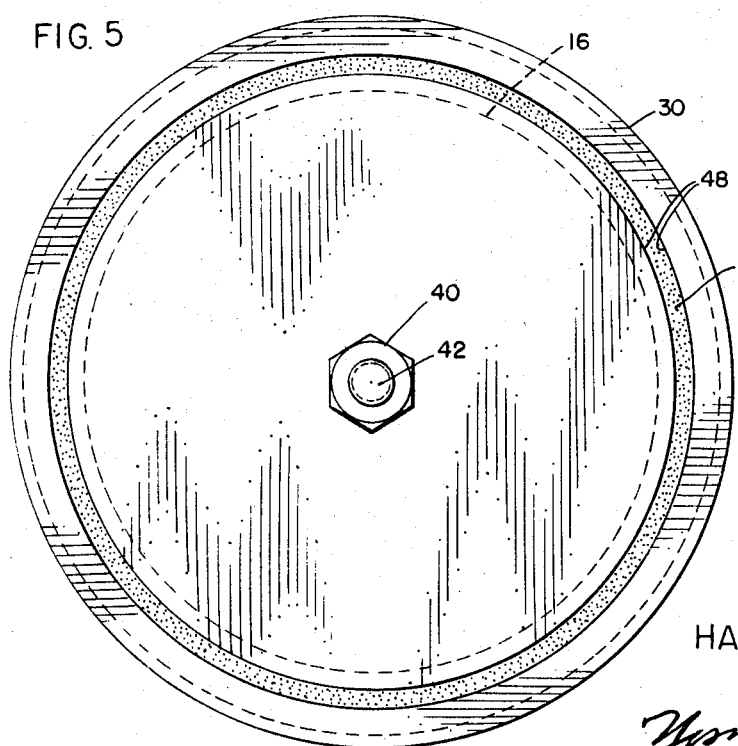
INVENTOR:
HAROLD C. MILLER
BY *Norman Gerlach*
ATT'Y May 21, 1968

H. C. MILLER 3,383,807

PERIPHERAL DIAMOND GRINDING WHEEL

Filed Nov. 19, 1964

INVENTOR:
HAROLD C. MILLER

BY *Norman Gerlach*

ATT'Y

United States Patent Office 3,383,807
Patented May 21, 1968

3,383,807
PERIPHERAL DIAMOND GRINDING WHEEL
Harold C. Miller, Chicago, Ill., assignor to Super-Cut, Inc., Chicago, Ill., a corporation of Illinois
Filed Nov. 19, 1964, Ser. No. 412,493
3 Claims. (Cl. 51—206)

ABSTRACT OF THE DISCLOSURE

A peripheral diamond grinding wheel which comprises a circular wheel body and a continuous annular grinding member around and in spaced relation with the body and in the form of a metal matrix and abrasive particles within the matrix, and is characterized by the fact that the space between the wheel body and the grinding member is filled by an intervening ring which is formed of ductile metal and adheres strongly to both the outer periphery of the wheel body and the inner periphery of the grinding member.

---

The present invention relates generally to rotary grinding wheels and has particular reference to that type of grinding wheel which is commonly referred to as a peripheral diamond grinding wheel. Such a grinding wheel comprises a flat circular steel body the periphery of which is surrounded by an annular grinding member in the form of a sintered metal matrix and crushed or fragmented diamonds or other abrasive particles homogenously distributed throughout the matrix.

In the manufacture of such a peripheral diamond grinding wheel, it has heretofore been the practice to mold the annular grinding member in situ directly onto the periphery of the circular steel body, utilizing a pair of fixed circular mold plates on opposite sides of the body, a fixed mold band around and in spaced relation with the peripheries of the circular mold plates, and a pair of axially movable mold rings between the band and the mold plates in order to establish around the peripheral region of the steel body a mold cavity for the material of which the grinding member is to be formed, namely, a mixture of powdered metal and diamond particles. Upon relative axial movement of the mold rings toward each other in the presence of heat, the mixture of powdered metal and diamond particles is compressed and there is performed a sintering operation which not only creates the annular grinding member but also bonds the member directly to the periphery of the steel body.

In the fabrication of a peripheral diamond grinding wheel as mentioned above, the simultaneous creation of the annular grinding member and bonding of the latter to the circular steel body often result in separation or fracture of the bond during cooling of the grinding member and steel body after creation or fabrication of the annular grinding member. Whereas steel has a linear coefficient of expansion of approximately $11 \times 10^{-6}$, most metal matrix materials have a coefficient of expansion of $5 \times 10^{-6}$ which is approximately one half that of steel. Furthermore, neither the steel nor the metal matrix material of the grinding member is particularly ductile and due to the wide expansion differential, it has been found in actual practice that, frequently, the steel body will pull away from the annular grinding member throughout nearly one half of the circumference of the steel body. Often the severance of the bond is not readily visible or perceptible and a peripheral diamond grinding wheel which possesses an imperfect or fractured bond where shipped to a user for operation will fail immediately upon its being put to use. In other instances, even if the bond holds during shipment, the wheel fails after a short period of use due to the tremendous residual tensional stresses which remain prevalent until torque is applied to the abrasive member when the wheel is put to use. In short, the successful manufacture and continued service of a peripheral diamond grinding wheel that is constructed according to the method briefly outlined above are the exception rather than the rule and many more grinding wheels of this type are discarded than ever are put into successful service.

The present invention is designed to overcome the aforementioned limitations that are attendant upon the fabrication and use of peripheral grinding wheels of the type under consideration and, accordingly, the invention contemplates the provision in a peripheral diamond grinding wheel of a ring which is formed of a ductile metal such, for example, as copper, is interposed between the outer periphery of the steel body and the inner periphery of the annular grinding member, and has its inner face securely bonded to the steel body and its outer face securely bonded to the annular grinding member. Application of the ductile ring and the annular grinding member to the steel body is made by utilizing fixed circular mold plates, a fixed mold band, and movable mold rings, as heretofore mentioned, and in the presence of heat. Either the periphery of the steel body or the inner face of the ductile ring is precoated with a bonding material, such as silver solder, and upon relative movement of the mold rings toward each other in the presence of heat, the solder becomes melted and the ductile ring, at the end of the cooling step and upon hardening of the solder, becomes bonded to the steel body while, at the same time, the annular grinding member is simultaneously formed and bonded to the ductile ring. After the mold parts are removed and cooling takes place, the steel body shrinks while the annular grinding member shrinks to a much lesser degree. However, the ductile ring continues to adhere to both the steel body and the annular grinding member and, due to its ductile nature, stretches in a radial direction, and since its coefficient of elasticity is extremely low, it becomes permanently de-formed and the resultant completed peripheral diamond grinding wheel assumes an over-all condition of molecular equilibrium which has hitherto been unattainable in connection with the manufacture of peripheral diamond grinding wheels by conventional methods.

A grinding wheel which is constructed in accordance with the aforementioned method will not, when put into service, be deleteriously affected by the application of counter-torque to the periphery thereof since little, if any, tensional stresses remain within the composite body of the wheel and the two areas of bond, namely, the circular area of bond between the ductile ring and the steel body and the circular area of bond between the ductile ring and the annular grinding member, are not under tension so that they will retain their effectiveness.

The provision of a novel peripheral diamond grinding wheel such as has been briefly set forth above being among the principal objects of the present invention, numerous other objects and advantages, not at this time enumerated, will readily suggest themselves as the following description ensues.

In the accompanying two sheets of drawings forming a part of this specification, one illustrative embodiment of the improved peripheral diamond grinding wheel and the method by means of which the wheel is formed is illustrated.

In these drawings:

FIG. 1 is a fragmentary side elevational view of a peripheral diamond grinding wheel embodying the invention;

FIG. 2 is an enlarged transverse sectional view taken on the line 2—2 of FIG. 1 and showing in detail the arrangement of the ductile ring between the steel body and the annular grinding member;

Figure 3:
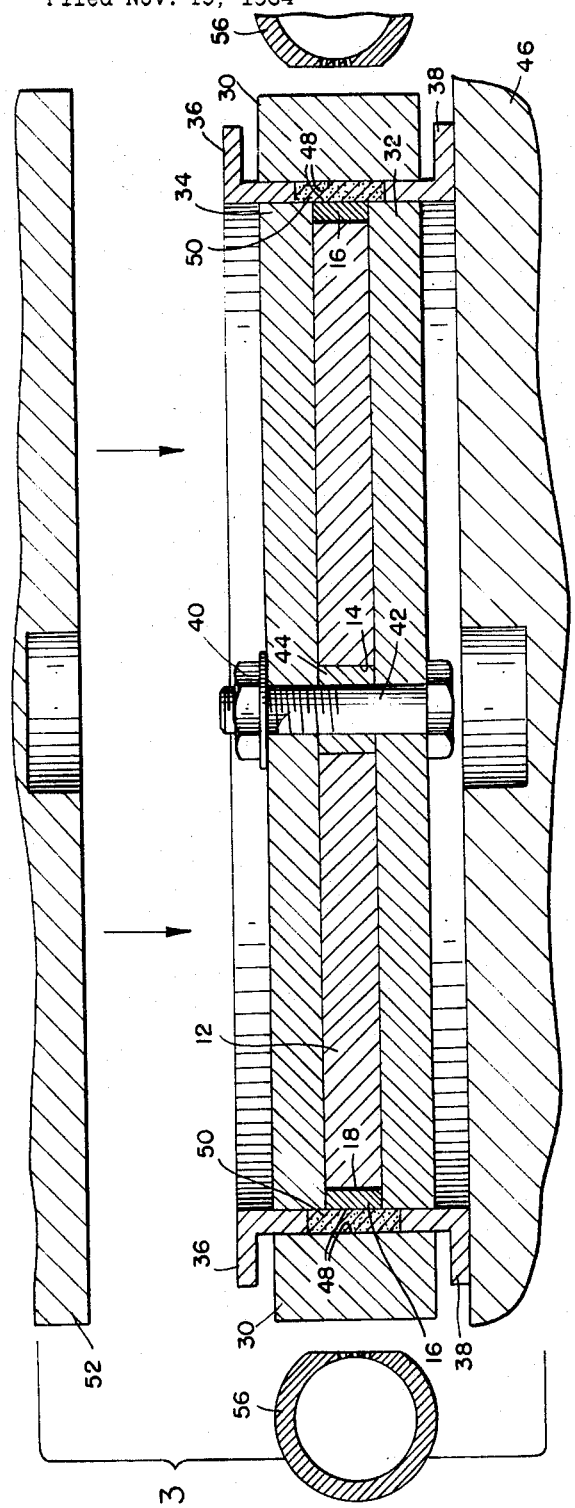
Figure 4:
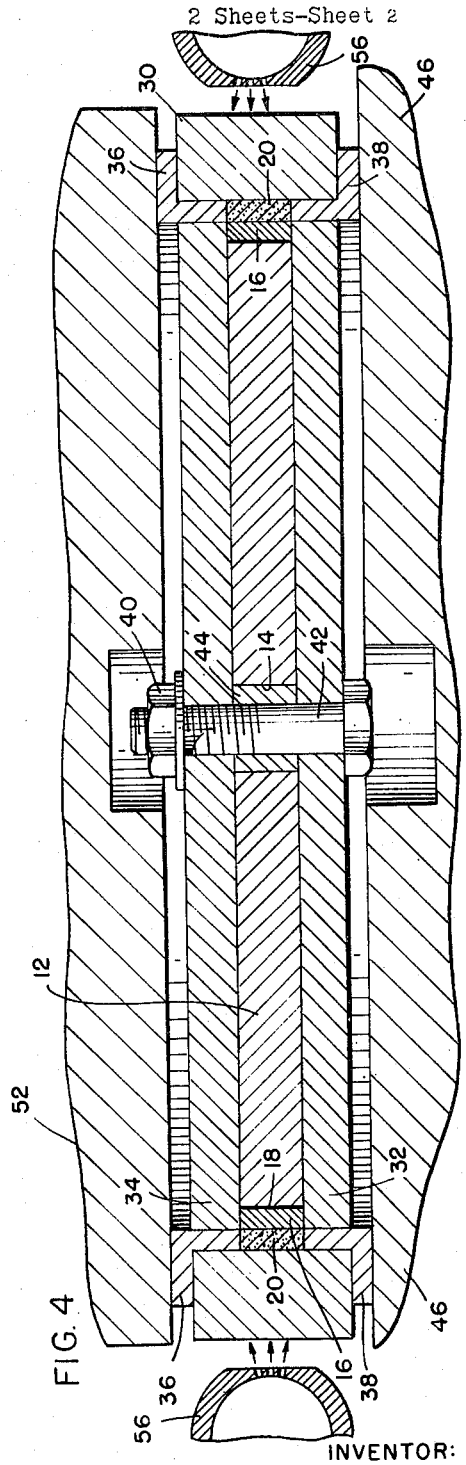

FIG. 3 is a fragmentary sectional view taken substantially centrally and vertically through the various mold instrumentalities or parts which are employed in connection with making or fabricating the improved peripheral grinding wheel, such view showing the aforesaid mold instrumentalities or parts in the relative positions which they assume immediately prior to the sintering and molding operation;

FIG. 4 is a sectional view similar to FIG. 3 but showing the mold instrumentalities or parts in the positions which they assume during the simultaneous sintering and molding operation; and FIG. 5 is a top plan view of the mold without the upper movable mold ring in order to leave open the mold cavity so that the mixture of powdered metal and diamond particles may be poured into it as a preliminary to the sintering and molding operation.

Referring now to the drawings in detail and in particular to FIGS. 1 and 2, there is illustrated a peripheral diamond grinding wheel and embodies the invention and is designated in its entirety by the reference numeral 10. Generally speaking, the wheel is of a composite nature and embodies a central circular steel body 12 having a central circular hole 14 by means of which the wheel may be mounted on a suitable power-driven shaft (not shown). Surrounding the periphery of the steel body 12 is a ring 16 of a relatively soft ductile metal, such as copper or other metal alloy or material having the required degree of ductility to accomplish functions that will be described presently. The ring 16 is bonded in any suitable manner as, for example, by silver solder or the like as indicated at 18 to the periphery of the steel body 12. A continuous annular grinding member 20 surrounds the ductile ring 18 and is bonded thereto in a manner that likewise will be made clear presently. Such grinding member is preferably in the form of a sintered metal matrix with diamond or other abrasive particles distributed substantially uniformly throughout the matrix.

As shown in FIG. 2, the axial thicknesses of the steel body 12, the ring 16, and the annular grinding member 20 are equal so that the two sides of the wheel, considered as a whole, are substantially planar throughout. The diameter of the steel body 12 and the radial thicknesses of the ring 16 and the annular grinding member 20 may vary within wide limits, the only requirement for the ring 16, in this respect, being that it must have sufficient radial thickness in its free state and before application to the body 12, to allow for radial elongation under the pulling influence of the centrifugal and centripetal forces that are exerted upon it by the annular grinding member 20 and steel body 12, respectively, during the cooling period which follows the simultaneous sintering and molding operation that is performed in constructing the annular grinding member at the time of fabrication of the grinding wheel as a whole.

As will be more fully appreciated after the method by means of which the grinding wheel 10 is constructed has been set forth more in detail hereafter, the composite grinding wheel 10 is substantially in molecular equilibrium throughout, there being no appreciable internal stresses, either tensional or compressional, in any direction throughout the body 12, the ring 16, or the annular grinding member 20.

Referring now to FIGS. 3, 4 and 5 wherein the method by means of which the grinding wheel 10 is constructed is illustrated, there is provided a horizontal mold comprising an outer annular mold band 30, a circular bottom plate 32, a circular top plate 34, and upper and lower, relatively movable mold rings 36 and 38. These mold parts may be made of a suitable metal such as steel.

In the construction or fabrication of the grinding wheel 10, the bottom plate 32, the top plate 34, the steel body 12, and the ductile ring 16 are assembled upon one another in the manner shown in FIG. 3, utilizing a nut 40 and a bolt 42 to secure the parts together in concentric relationship. If required, a spacer bushing or collar 44 around the shank of the bolt and within the hole 14 is utilized to center the body 12 on the bolt 42. A coating of the silver solder 18 or other heat-flowable bonding material is applied either to the outer face of the steel body 12 or the inner face of the ring 16 or to both of such faces prior to assembly of the body and the ring upon each other.

It is to be noted at this point that the outer marginal portions of the bottom and top plates 32 and 34 overhang the outer periphery of the steel body 12, thus providing an annular groove which is completely filled by the ring 16 of copper or other ductile material. When the ring is thus in place within the groove, the three parts 32, 34 and 16 present a continuous cylindrical outer surface.

The thus assembled parts 12, 32, 34 and 16 are then centered within the lower mold ring 38 and the mold band 30 is centered about the lower mold ring as shown in FIG. 3, said lower mold ring being supported upon the bed plate or platen 46 of a suitable press. Assembly of the mold parts 30, 32 and 34 upon or around the body 12 and the ductile ring 16 establishes an upwardly opening annular mold cavity 48, this cavity being defined or bounded by portions of the plates 32 and 34, the ductile ring 16 and the mold ring 30. Into this cavity there is poured a quantity of molding mixture 50 in the form of metal powder and abrasive particles. The abrasive component of the mixture may be fragmented or crushed diamonds or comminuted tungsten carbide well distributed throughout the metal powder. Numerous other commercial molding mixtures with or without a diamond content are available for use in the construction of the annular grinding member 20. The grit size of the diamond content, if any, may vary widely and is not critical. Neither is the diamond concentration critical. The mixture 50 may be a mixture of tungsten carbide powder and cobalt powder. Such a mixture is available on the market in grit sizes from one to five microns. If desired, the tungsten carbide component may be replaced in its entirety or in part by titanium or tantalum carbide. Irrespective, however, of the particular molding mixture which is employed to make the annular grinding member 20, the essential features of the present method are not altered.

After the mold parts, with the exception of the upper mold ring 36, have been assembled upon the body 12 and the ductile ring 16 in the manner previously described, and the mold cavity 48 has been filled with the molding mixture 50, the cavity 48 is then closed by application of the upper mold ring 36. Thereafter, the aforementioned press is operated to bring the press ram 52 thereof downwardly as indicated by the arrows in FIG. 3 and into engagement with the upper mold ring 36. The molding mixture 50 is thus compressed, while at the same time, heat is applied to the mold in any suitable manner as, for example, by the application to the mold band 30 of a series of inwardly directed flame jets 54 issuing from a gaseous fuel burner ring 56.

The pressure that is employed in closing the mold is not critical and may be on the order of two tons per square inch. The temperature that is involved in the application of the flame jets 54 is sufficient effectively to perform the sintering operation and at the same time to establish a firm bond between the thus created annular grinding member 20 and the ductile ring 16 by a direct fusing of the involved metals. It is also sufficient to melt the previously applied silver solder 18 and establish a firm bond between the inner face of the ductile ring 16 and the outer face or periphery of the steel body 12.

The various mold parts are then removed from the completely fabricated wheel 10 and the wheel parts are allowed to cool in the ambient atmosphere. During such cooling operation, the phenomena upon which the aforementioned method is predicated takes place, and after the wheel has cooled to room temperature it is ready for service without further treatment.

During the cooling period, and due to the fact that there is a wide difference between the coefficient of thermal expansion of the annular grinding member 20 and that of the steel body 12, the copper-filled gap or annulus which exists between the outer periphery of the steel body 12 and the inner periphery or face of the grinding member 20 increases appreciably in radial width. Stated more simply, the steel body shrinks to a greater extent than does the annular grinding member. However, the tenacity of the bond which exists between the grinding member 20 and the ductile ring 16 and of the bond which exists between the ductile ring 16 and the steel body 12 is such that the ductile ring 16 is "stretched radially," so to speak, and both bonds remain effectively intact. Since the ductile ring 16 possesses only a very slight degree of elasticity, its elastic limit is progressively overcome during each increment of radial elongation thereof and molecular equilibrium obtains within the internal structure of the ductile ring throughout the entire wheel-shrinking process. Because of this molecular equilibrium within the ductile ring, very little tensional stress is applied to the steel body 12 through the ring 16, and the body likewise remains devoid of internal tensional stresses in a radial direction.

The invention is not to be limited to the exact design or arrangement of parts of the peripheral diamond grinding wheel 10 of FIGS. 1 and 2, nor to the exact method steps that are, in effect, illustrated in FIGS. 3, 4 and 5. Therefore, only insofar as the invention has particularly been pointed out in the accompanying claims is the same to be limited.

Having thus described the invention what I claim as new and desire to secure by Letters Patent is:

1. A peripheral grinding wheel comprising a circular steel wheel body having a continuous annular grinding member having a lower over-all coefficient of expansion than the steel from which the wheel body is formed and in the form of a sintered metal matrix and abrasive particles within the matrix, bonded thereto in concentric surrounding relationship by means of an intervening ring of a ductile metal, the ring being directly fused to the inner periphery of the grinding member and indirectly fused to the outer periphery of the steel wheel body by a coextensive coating of a fusible alloy.

2. A peripheral diamond grinding wheel comprising: (a) a circular metal wheel body, (b) a continuous annular grinding member in the form of a sintered metal matrix and diamond particles distributed substantially uniformly throughout the matrix, surrounding said wheel body in concentric relationship and having a lower over-all coefficient of expansion than the metal of which the wheel body is formed, and (c) an intervening ring of a ductile metal interposed between the grinding member and the wheel body, said ring being directly fused and thus adhered to the inner periphery of the grinding member and indirectly fused and thus adhered to the outer periphery of the wheel body by a coextensive coating of a fusible alloy.

3. A peripheral diamond grinding wheel as set forth in claim 2 and wherein said intervening ring of ductile material is formed of copper and the fusible alloy is in the form of silver solder.

References Cited

UNITED STATES PATENTS

| | | | |
|---|---|---|---|
| 2,072,051 | 2/1937 | Van der Pyl | 51—205 |
| 2,137,200 | 11/1938 | Boyer | 51—209 X |
| 2,173,833 | 9/1939 | Fitz. | |
| 3,290,834 | 12/1966 | Lindblad | 51—209 X |

ROBERT C. RIORDON, *Primary Examiner.*

D. G. KELLY, *Assistant Examiner.*